(12) United States Patent
Chen

(10) Patent No.: US 6,494,167 B1
(45) Date of Patent: Dec. 17, 2002

(54) SOLID AND LIQUID SEPARATION DEVICE

(75) Inventor: Shih Ming Chen, Abbotsford (CA)

(73) Assignee: 625606 B.C. Ltd., Vancouver (CA)

( * ) Notice: Subject to any disclaimer, the term of this patent is extended or adjusted under 35 U.S.C. 154(b) by 0 days.

(21) Appl. No.: 09/888,401

(22) Filed: Jun. 26, 2001

(51) Int. Cl.[7] .................................................. A01K 1/01
(52) U.S. Cl. ....................... 119/479; 119/442; 119/447; 119/450
(58) Field of Search ............................... 119/479, 442, 119/447, 450

(56) References Cited

U.S. PATENT DOCUMENTS

| | | | | |
|---|---|---|---|---|
| 3,685,493 A | * | 8/1972 | Weiland, Jr. ................... | 119/28 |
| 3,698,361 A | * | 10/1972 | Lecce ....................... | 119/51.11 |
| 3,721,214 A | * | 3/1973 | Staples et al. ................. | 119/22 |
| 4,060,054 A | * | 11/1977 | Blair ........................... | 119/16 |
| 4,787,338 A | * | 11/1988 | Stanley, Sr. et al. .......... | 119/22 |
| 5,832,873 A | * | 11/1998 | Tu .............................. | 119/479 |
| 5,968,353 A | * | 10/1999 | Herbert et al. ........... | 210/221.3 |

* cited by examiner

Primary Examiner—Peter M. Poon
Assistant Examiner—Bret Hayes
(74) Attorney, Agent, or Firm—Bacon & Thomas, PLLC

(57) ABSTRACT

A solid and liquid separation device includes a housing provided with a heater so that liquid contained in the housing will not freeze. A filter net layer may divide the housing into an upper space and a lower space. A conveying assembly includes a plurality of connecting rods each having a scraper and a brush. The scraper may contact the filter net layer for driving solids, and the brush may remove solids attached on the filter net layer. A squeeze assembly includes a cylinder provided with a threaded rod that may be rotated to output the solids. A liquid spraying assembly includes a water pumping member for delivering water liquid through a conveying pipe to be sprayed toward the filter net layer through a plurality of nozzles.

11 Claims, 9 Drawing Sheets

SOLID AND LIQUID SEPARATION DEVICE

BACKGROUND OF THE INVENTION

1. Field of the Invention

The present invention relates to a solid and liquid separation device, and more particularly to a movable solid and liquid separation device that will not be affected by the weather.

2. Description of the Related Art

The closest prior art of which the applicant is aware is disclosed in U.S. Pat. No. 5,832,873, entitled "Solid and Liquid Separation Machine", and is shown in FIG. 12. The separation machine includes a body 90 having two ends respectively provided with a rotation shaft 91 and a drive gear 92. One rotation shaft 91 is driven to rotate by the motor 93. A chain 94 is mounted between the two drive gears 92. A scraper 97 is secured on the chain 94 by a fixing plate 95 and a locking plate 96, for carrying upward the solids contained in the waste water, and squeezing the water contained in the solids. The front section of the bottom of the body 90 is provided with a bottom net 98, and the rear section of the bottom of the body 90 is provided with a bottom plate 99. The squeezed solids are then carried upward by the scraper 97 to drop into a collecting tank.

However, when the solids are carried upward by the scraper 97, the bottom net 98 is easily blocked by the solids, thereby greatly affecting the water filtering effect, and thereby easily causing inconvenience in operation and increasing the cost of maintenance. In addition, when the atmospheric temperature is decreased to 0° C., the liquid will freeze. Thus, the solid and liquid separation machine cannot conveniently separate the solid from the liquid.

SUMMARY OF THE INVENTION

The primary objective of the present invention is to provide a solid and liquid separation device that may reduce the blocking problem caused by solids contained in waste water that is produced by various kinds of industry, thereby efficiently separating the solid from the liquid.

A secondary objective of the present invention is to provide a solid and liquid separation device that is not influenced by the weather, thereby exactly separating the solid from the liquid.

In accordance with the present invention, there is provided a solid and liquid separation device, comprising:

- a housing, including a filter net layer for dividing the housing into an upper space and a lower space, the upper space of the housing provided with a water inlet pipe for introducing waste water to be treated, the lower space located under the filter net layer capable of collecting water liquid, the lower space of the housing having a wall provided with a water outlet for drawing out liquid that has been treated and separated;
- a conveying assembly, mounted in the housing located above the filter net layer, and including two rotation shafts co-operating with two drive members, a plurality of connecting rods mounted between the two drive members, each connecting rod including a scraper and a brush, the scraper capable of contacting the filter net layer for driving solids toward a terminal, the brush capable of removing solids attached on the filter net layer;
- a squeeze assembly, including a cylinder for supporting solids falling from the housing, the cylinder provided with. a threaded rod that is driven to rotate by a power member, the rotating threaded rod capable of outputting the solids toward an outlet; and
- a liquid spraying assembly, including a water pumping member for delivering water liquid through a conveying pipe to be sprayed toward a bottom of the filter net layer through a plurality of nozzles.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
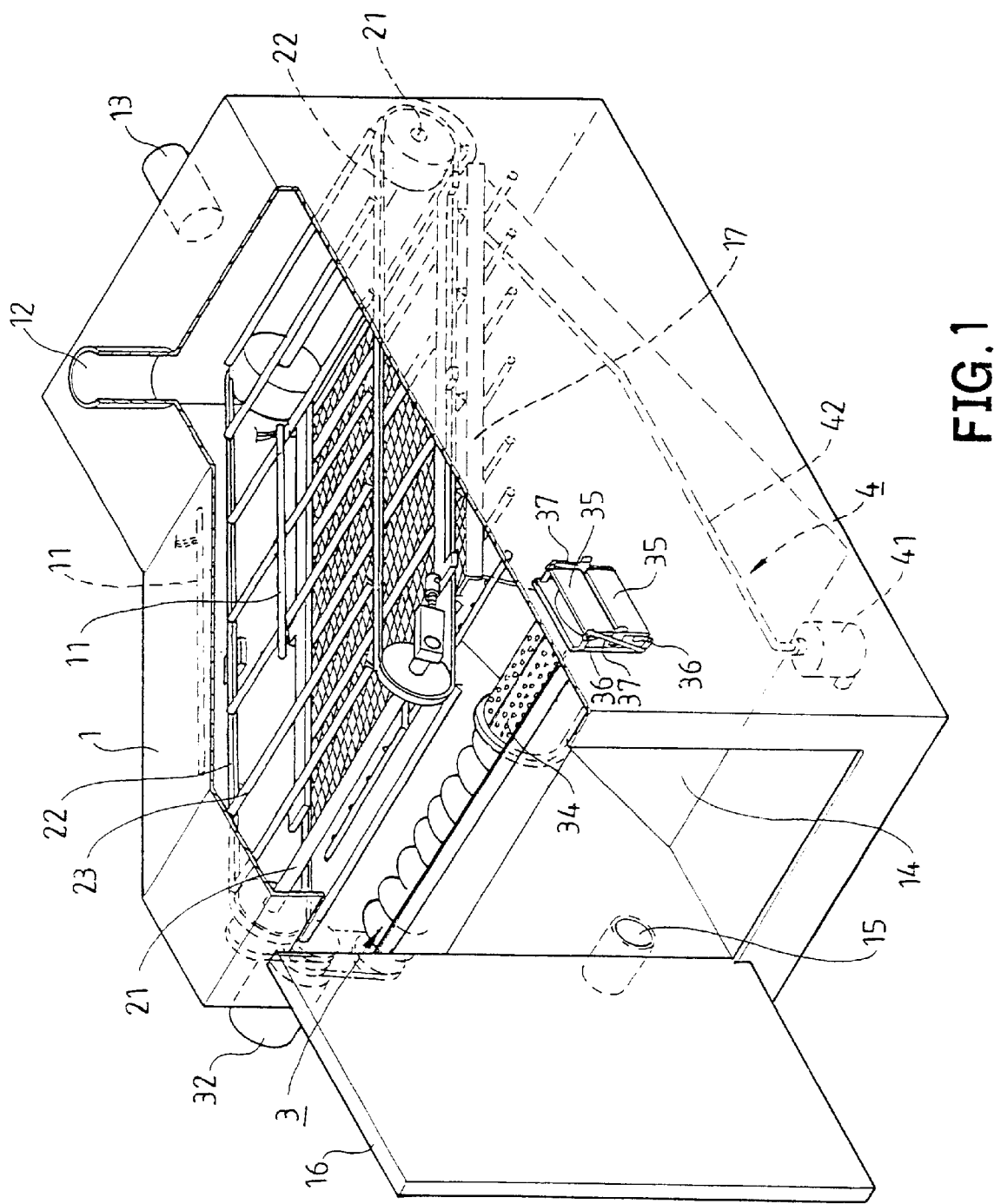
FIG. 1 is a perspective view of a solid and liquid separation device in accordance with a first embodiment of the present invention.
Figure 2:
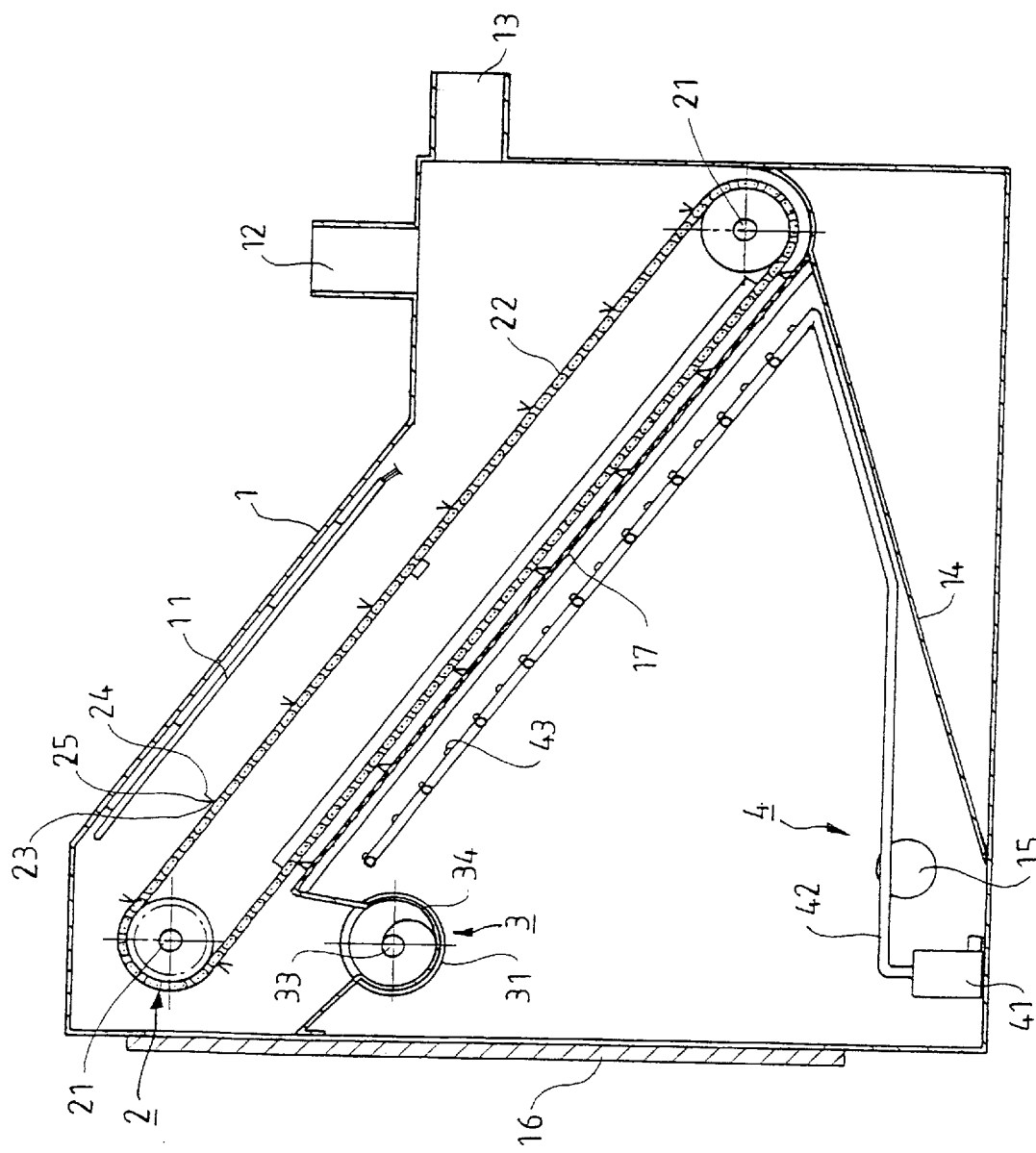
FIG. 2 is a side plan cross-sectional view of the solid and liquid separation device as shown in FIG. 1.

Referring to the drawings and initially to FIGS. 1 and 2, a solid and liquid separation device in accordance with a first embodiment of the present invention comprises a housing 1, a conveying assembly 2, a squeeze assembly 3, and a liquid spraying assembly 4.

The housing 1 may form the outer shell of the entire solid and liquid separation device, and may be made of waterproof and thermal retardation material. The housing 1 contains at least one heater 11 which may be a conventional insulating heater. The heater 11 may be immersed in the lower position of the housing 1, or located at a higher position of the housing 1 as shown in the figures. The heater 11 may use a conventional temperature control switch to constantly maintain the housing 1 at a temperature range that will not freeze the liquid. The preferable temperature is about 5° C. The housing 1 itself has a filter net layer 17 which divides the inner space of the housing 1 into upper and lower space. The upper space has a water inlet pipe 12, and an overflow pipe 13. The water inlet pipe 12 may introduce waste water containing solids, wherein most of the water liquid falls into the lower space through the filter net layer 17. When the amount of the introduced waste water exceeds the water filtering rate of the filter net layer 17, the extra waste water flows out through the overflow pipe 13 to be restored by an external pipe, and is again introduced through the water inlet pipe 12. In addition, the lower space of the housing 1 is provided with an oblique plate 14 that may introduce water liquid falling from the filter net layer 17 to a lower position. The housing 1 is provided with a water outlet 15 located at a lower position, for draining the separated water liquid locally. The housing 1 has at least one door plate 16. When the door plate 16 is closed, it has a better sealing effect, so that the water liquid in the housing 1 will not leak from the door plate 16. When the door plate 16 is opened, it facilitates maintenance, assembly and disassembly of the parts in the housing 1.

Figure 4:
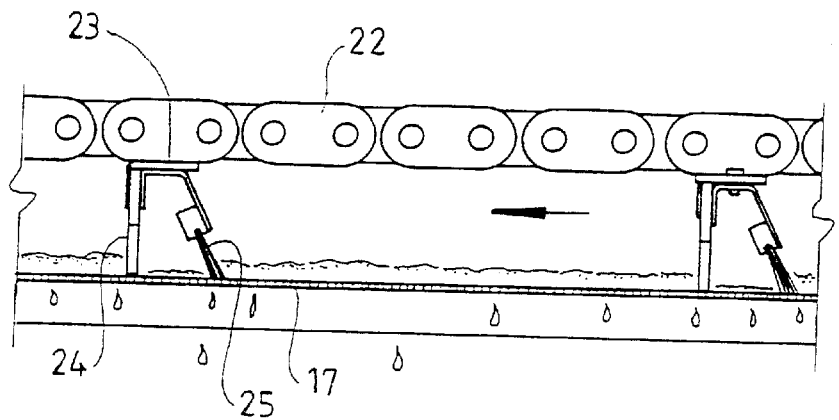
FIG. 4 is a locally enlarged view of the solid and liquid separation device as shown in FIG. 3.

The conveying assembly 2 includes two rotation shafts 21 wound around two drive members 22 at two sides, and the drive members 22 are driven by a power member such as a motor to perform a cycle operation. A plurality of connecting rods 23 (see FIG. 4) are combined between the two drive members 22. The connecting rod 23 includes a scraper 24 and a brush 25. The scraper 24 contacts the filter net layer 17, so that the solids may be driven by the scraper 24. The brush 25 has a greater length, and is located behind the scraper 24 (for the travel direction of the drive member 22). Thus, when the solids are attached in the meshes of the filter net layer 17, the solids can be cleaned out by the brush 25, and will be scraped by the following scrapers 24.

Figure 5:
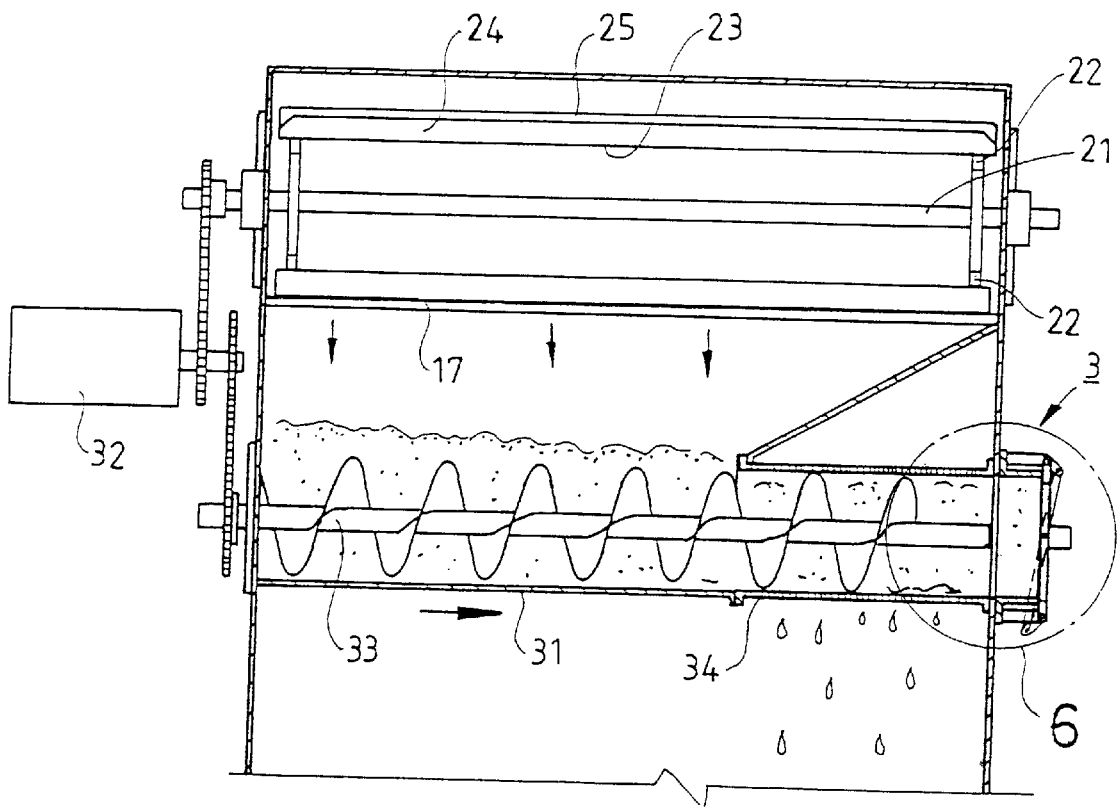
FIG. 5 is a cross-sectional view of the solid and liquid separation device along line 5—5 as shown in FIG. 3.
Figure 6:
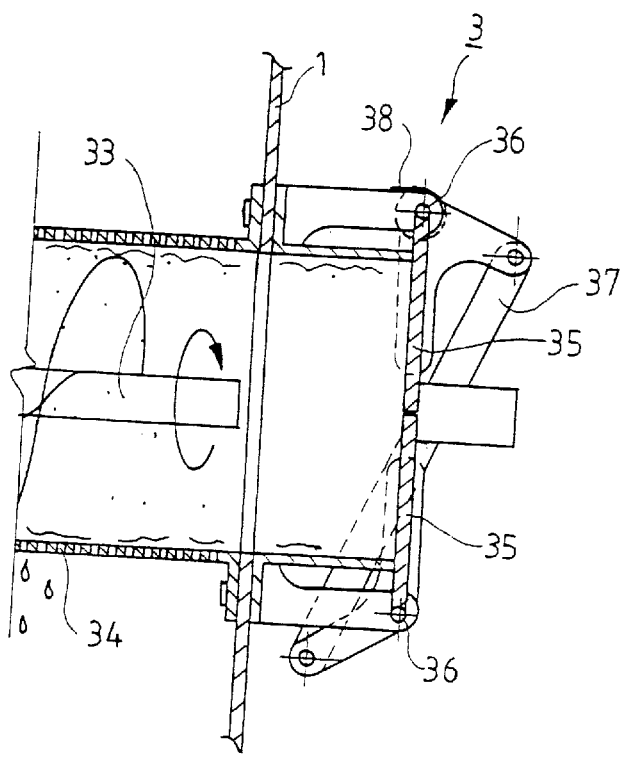
FIG. 6 is a locally enlarged view of the solid and liquid separation device as shown in FIG. 5.
Figure 7:
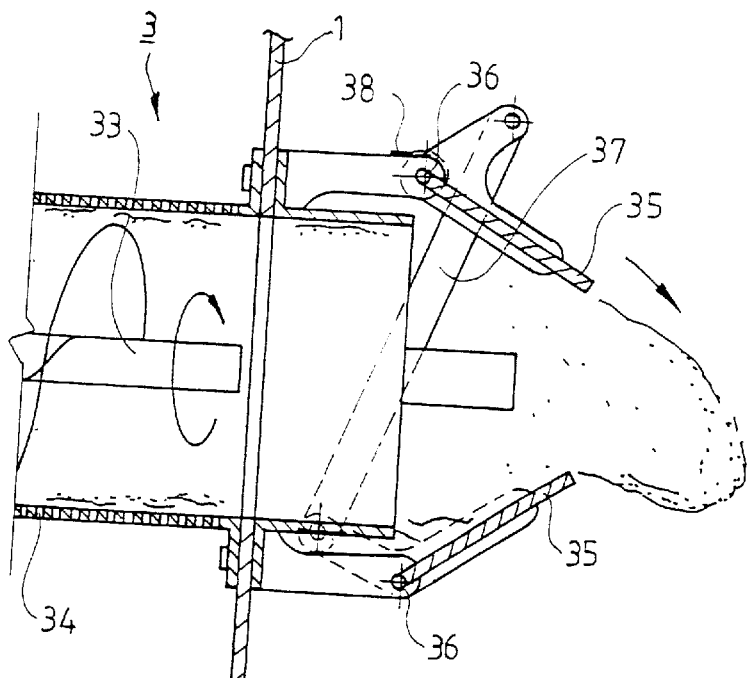
FIG. 7 is an operational view of the solid and liquid separation device as shown in FIG. 6.

Referring to FIGS. 1 and 2, the squeeze assembly 3 is located at the higher position, and located at the position of the upper rotation shaft 21 of the conveying assembly 2. Thus, when the solids driven by the scrapers 24 falls from the distal end of the filter net layer 17, the solids may drop on the cylinder 31 of the squeeze assembly 3 (see FIG. 5). The cylinder 31 is provided with a threaded rod 33 that may be driven by a power member 32. The threaded rod 33 may output the falling solids toward an outlet. The cylinder 31 is provided with a net layer 34 adjacent to the outlet. Thus, when the threaded rod 33 is rotated to drive the solids, water liquid contained in the solids may be extracted again, and may fall into the lower space of the housing 1. The outlet of the squeeze assembly 3 is provided with door plates 35 that may be opened and closed automatically by pressure. Referring to FIGS. 6 and 7, when the solids driven by the threaded rod 33 have a greater pressure, the door plates 35 are pushed and opened by the solids, so that the solids may drop outward to be collected. As shown in the figures, each door plate 35 is pivoted by a pivot axle 36, and a connecting rod 37 is mounted between the two door plates 35. Thus, the two door plates 35 may be opened synchronously as shown in FIG. 7. The pivot axle 36 of at least one door plate 35 is provided with a restoring member 38 such as a torsion spring. Thus, when the restoring force of the restoring member 38 is greater than the pressure of the solids, the door plates 35 are closed automatically as shown in FIG. 6.

Figure 3:
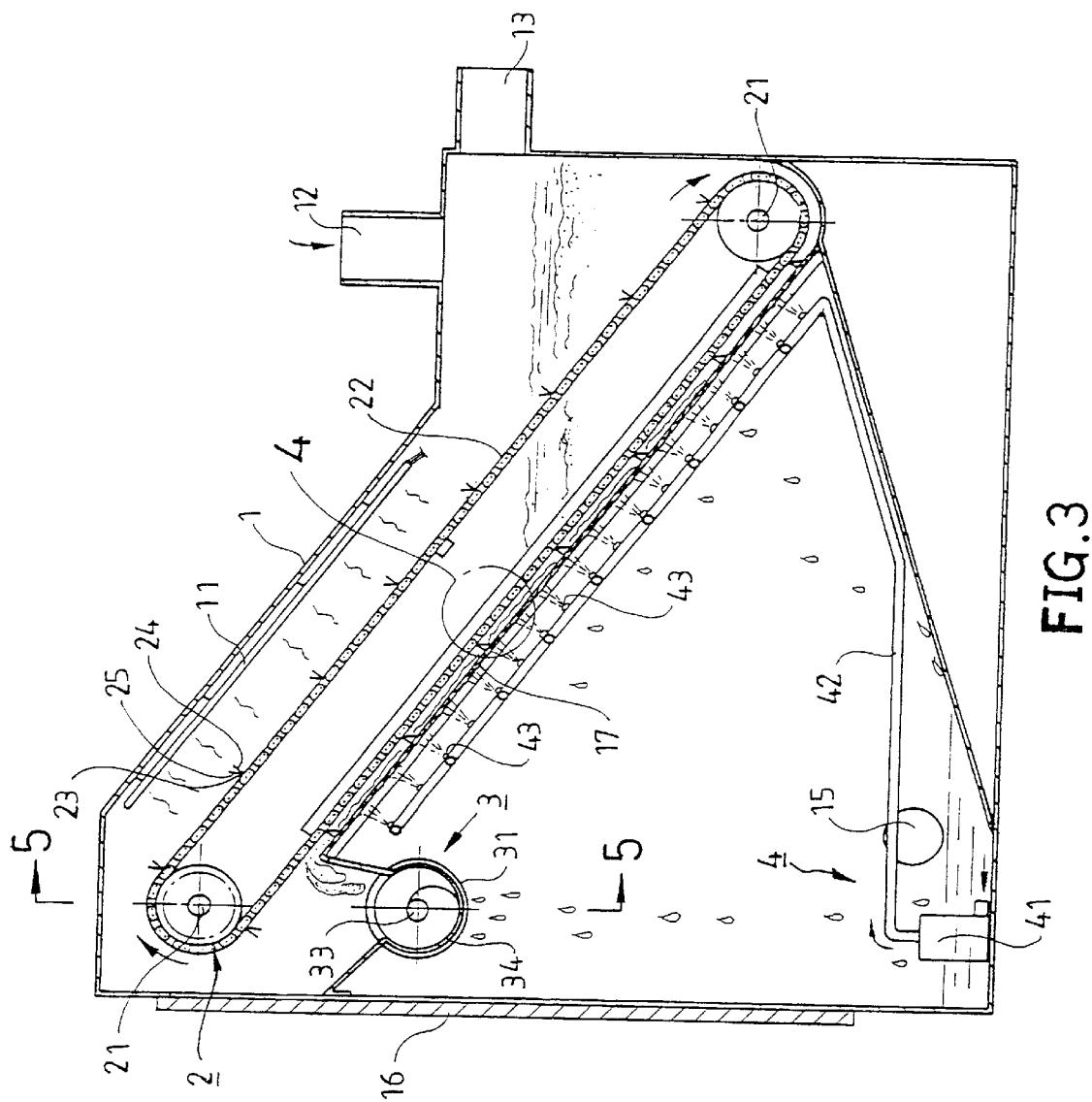
FIG. 3 is an operational view of the solid and liquid separation device as shown in FIG. 2.

Referring to FIGS. 2 and 3, the liquid spraying assembly 4 includes a water pumping member 41 for pumping the water liquid collected at the lower position of the lower space of the housing 1, through a conveying pipe 42 to be ejected outward through a plurality of nozzles 43, so that the water liquid can be used to wash and clean the filter net layer 17. The water pumping member 41 may be provided with filter equipment such as a filter net, for filtering fine solids, thereby preventing blocking the nozzles 43.

Figure 8:
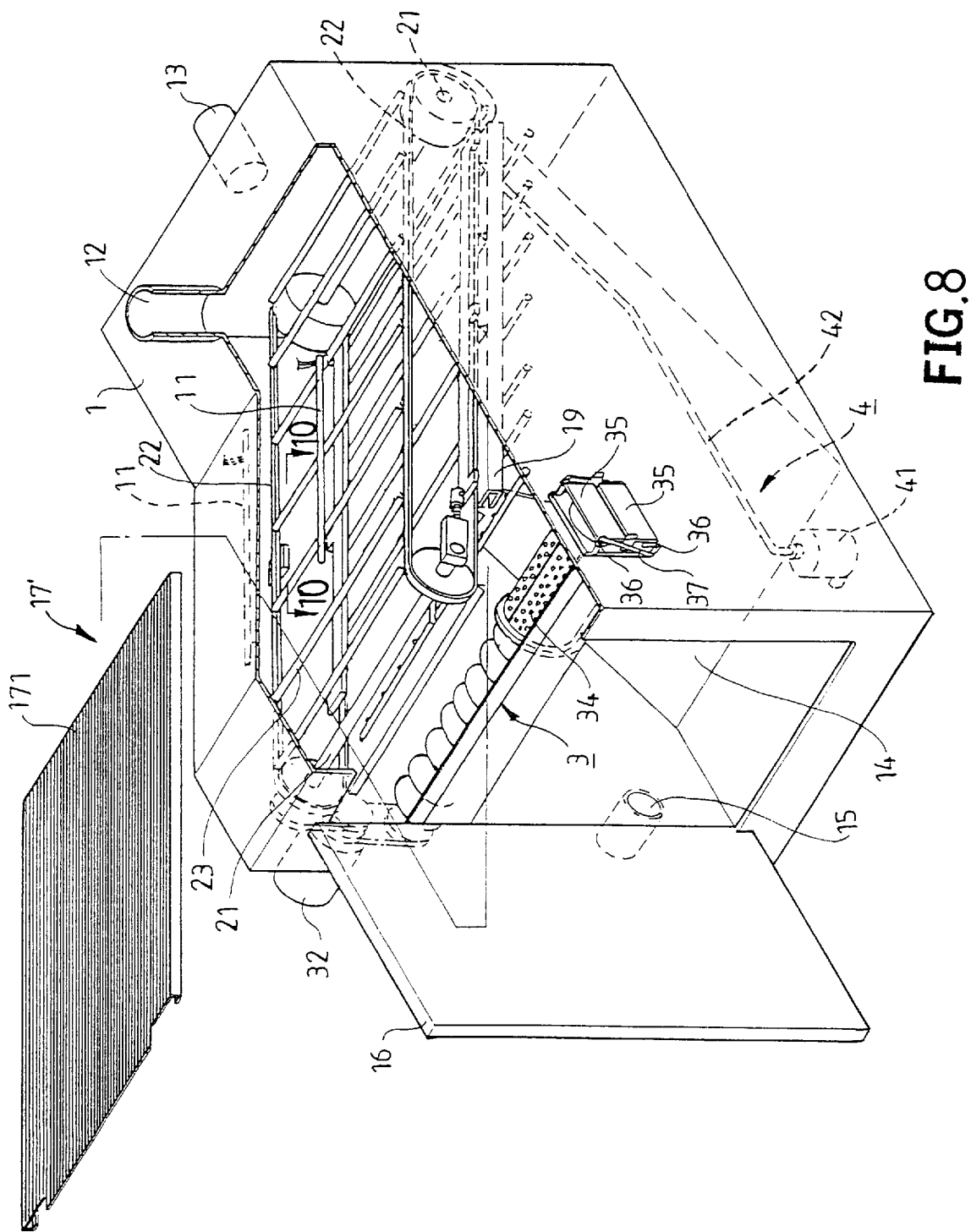
FIG. 8 is a perspective view of a solid and liquid separation device in accordance with a second embodiment of the present invention.
Figure 9:
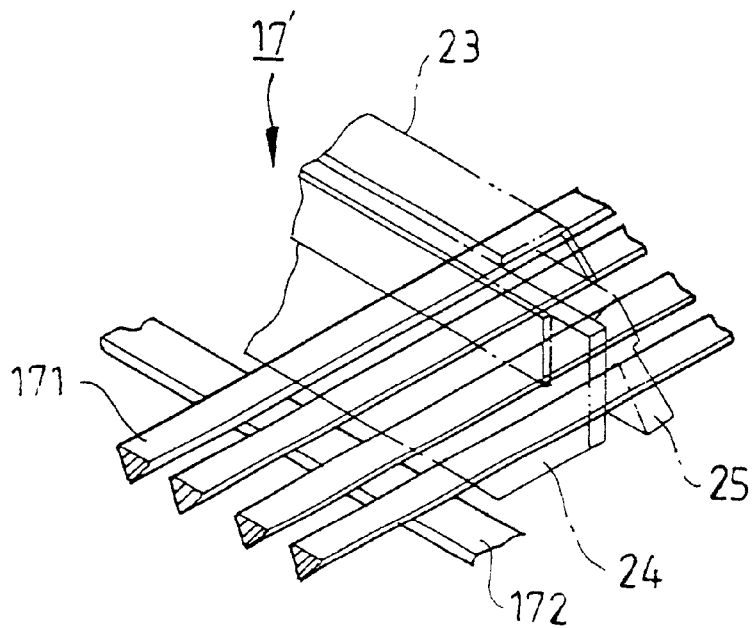
FIG. 9 is a perspective view of a filter net layer of the solid and liquid separation device in accordance with the second embodiment of the present invention.
Figure 10:
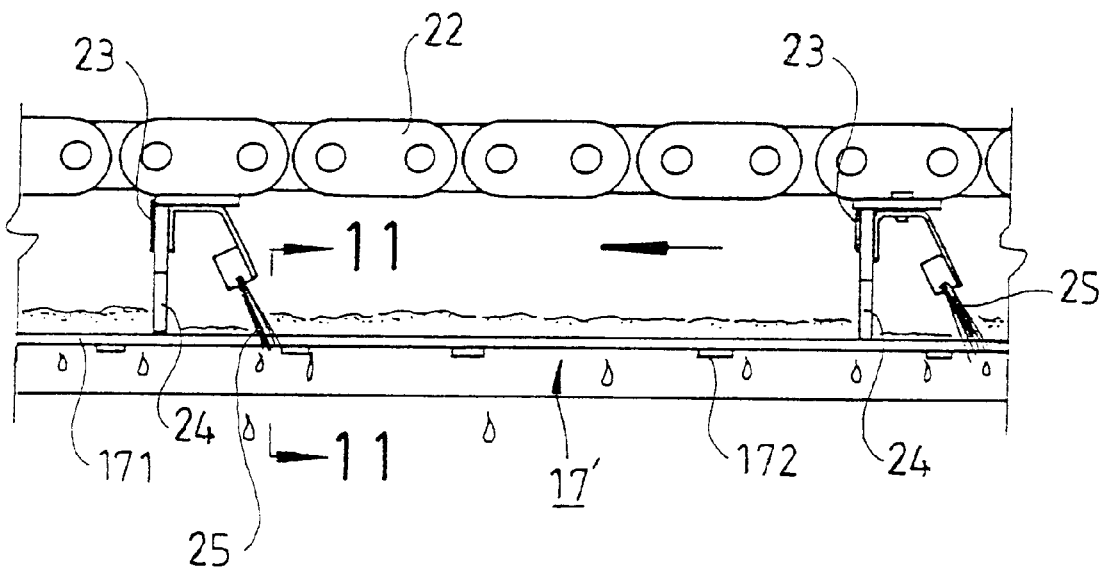
FIG. 10 is a cross-sectional view of the solid and liquid separation device along line 10—10 as shown in FIG. 8.
Figure 11:
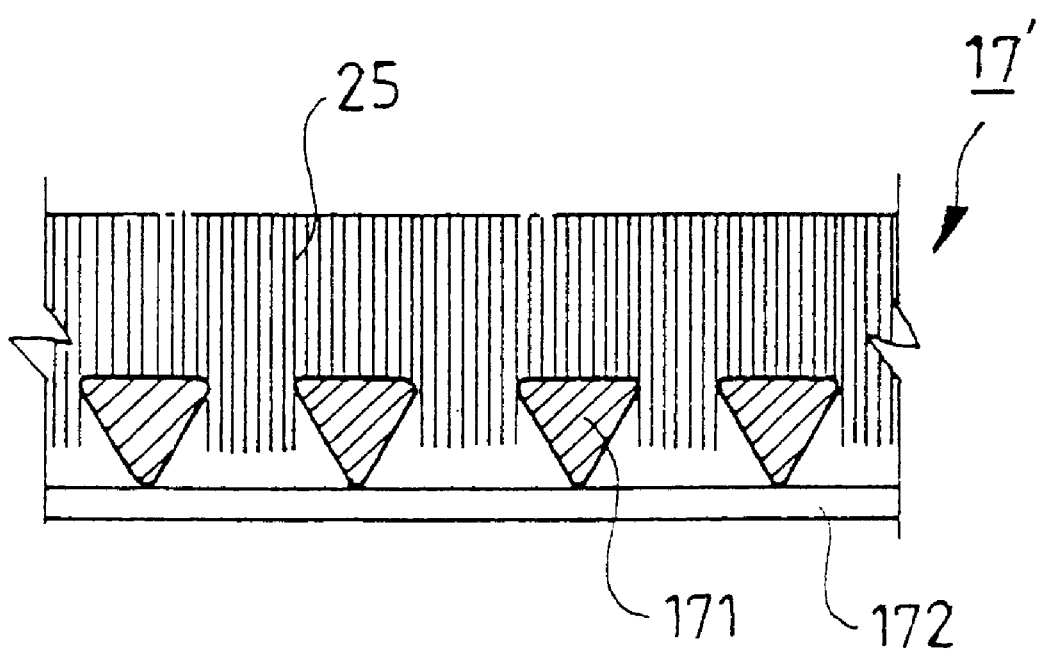
FIG. 11 is a cross-sectional view of the solid and liquid separation device along line 11—11 as shown in FIG. 10.
Figure 12:
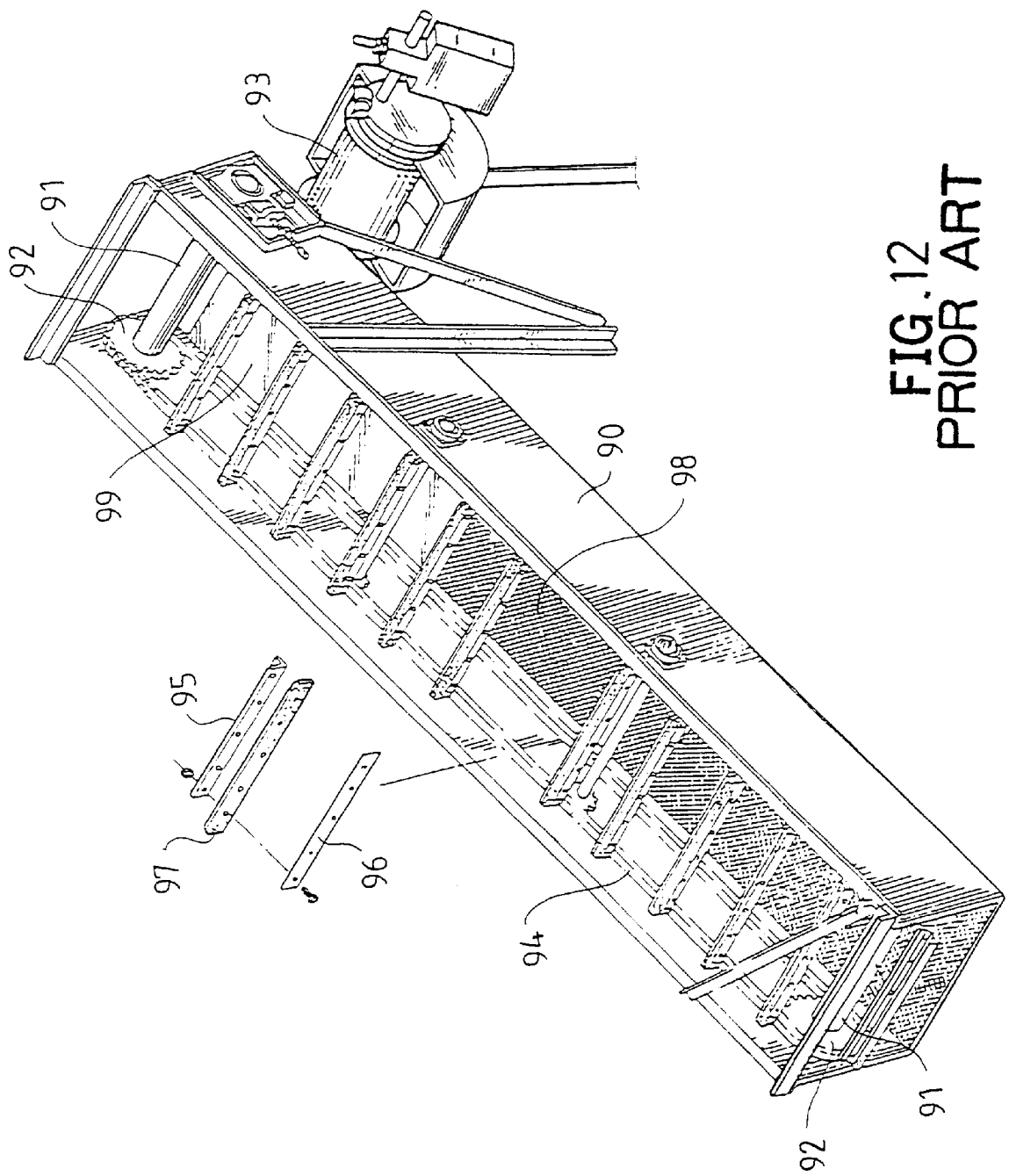
FIG. 12 is a perspective view of a conventional solid and liquid separation device in accordance with the prior art.

Referring to FIGS. 8 and 9, in accordance with a second embodiment of the present invention, the filter net layer 17' consists of grid-shaped grid bars 171 and crossbars 172. The filter net layer 17' divides the housing 1 into upper and lower spaces. The grid bars 171 is arranged by multiple bars, and the crossbars 172 are supported and secured on the bottom of the grid bars 171. The two sides of the filter net layer 17' are respectively inserted into the grooves 19 formed in the two side walls of the housing 1, so that the filter net layer 17' can be conveniently inserted into and removed from the housing 1, thereby facilitating clearing and maintenance of the filter net layer 17'. The filter net layer 17' also contacts the scrapers 24 and the brushes 25 of the conveying assembly 2 as shown in FIGS. 10 and 11, for driving the solids and removing the solids attached in the gaps between the grid bars 171. The grid bars 171 of the filter net layer 17' may have an inverted triangular shape as shown in FIG. 11. Thus, a gap that expands downward is defined between two adjacent grid bars 171. In such a manner, wastes having a strip shape will not block the filter net layer 17', while the blocked wastes are easily removed by the brush 25.

Accordingly, the solid and liquid separation device in accordance with the present invention may be used to separate solid and liquid, without being affected by the weather. Almost all of the parts are placed in the housing, thereby facilitating transportation and building. The device may be directly used when the circuit and pipes are connected, thereby saving cost of building. The liquid spraying assembly may be used to spray water liquid toward the filter net layer, thereby preventing the filter net layer from being blocked by solids. In addition, the solids attached on the filter net layer may be removed by the scraper and the brush, thereby providing a double clearing effect. Thus, the solid and liquid can be separated more exactly and efficiently.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A solid and liquid separation device, comprising:
a housing, including a filter net layer for dividing said housing into an upper space and a lower space, said upper space of said housing provided with a water inlet pipe for introducing waste water to be treated, said lower space located under said filter net layer capable of collecting water liquid, said lower space of said housing having a wall provided with a water outlet for drawing out liquid that has been treated and separated;
a conveying assembly, mounted in said housing located above said filter net layer, and including two rotation shafts co-operating with two drive members, a plurality of connecting rods mounted between said two drive members, each connecting rod including a scraper and a brush, said scraper capable of contacting said filter net layer for driving solids toward a terminal, said brush capable of removing solids attached on said filter net layer;
a squeeze assembly, including a cylinder for supporting solids falling from said housing, said cylinder provided with a threaded rod that is driven to rotate by a power member, said rotating threaded rod capable of outputting said solids toward an outlet; and
a liquid spraying assembly, including a water pumping member for delivering water liquid through a conveying pipe to be sprayed toward a bottom of said filter net layer through a plurality of nozzles.

2. The solid and liquid separation device as claimed in claim 1, wherein said housing is provided with door plates that may be opened and closed, for assembling, dismantling and maintenance of parts in said housing.

3. The solid and liquid separation device as claimed in claim 1, wherein said housing contains a heater that may be mounted in a bottom of said housing.

4. The solid and liquid separation device as claimed in claim 1, wherein said housing is provided with an overflow pipe, so that excessive waste water may be drawn out, and may be introduced again through said water inlet pipe.

5. The solid and liquid separation device as claimed in claim 1, wherein said water pumping member of said liquid spraying assembly is provided with a filter equipment including a filtering net.

6. The solid and liquid separation device as claimed in claim 1, wherein said brush has a length greater than that of said scraper, and said brush is located behind said scraper for a travel direction of said drive member.

7. The solid and liquid separation device as claimed in claim 1, wherein said filter net layer consists of a plurality of grid bars, and a plurality of crossbars secured on bottoms of said grid bars.

8. The solid and liquid separation device as claimed in claim 1, wherein said cylinder of said squeeze assembly is provided with a net layer adjacent to said outlet, for filtering water.

9. The solid and liquid separation device as claimed in claim 1, wherein said squeeze assembly has a terminal provided with door plates, and said door plates are provided with a restoring member, so that said door plates can be closed automatically.

10. The solid and liquid separation device as claimed in claim 9, wherein said terminal of said squeeze assembly is provided with two door plates, and a connecting rod mounted between said two door plates.

11. The solid and liquid separation device as claimed in claim 7, wherein said grid bar has a cross-section of an inverted triangular shape.

* * * * *